(12) United States Patent
Buell et al.

(10) Patent No.: US 6,320,323 B1
(45) Date of Patent: Nov. 20, 2001

(54) EL DRIVER WITH LAMP DISCHARGE MONITOR

(75) Inventors: Brian Jeffrey Buell, Gilbert, AZ (US); Grady M. Wood, Melbourne, FL (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/573,900

(22) Filed: May 18, 2000

(51) Int. Cl.[7] .................................................. H05B 37/00
(52) U.S. Cl. ........................ 315/169.3; 315/120; 315/129
(58) Field of Search ............................... 315/169.3, 119, 315/120, 129, 209 R, 224

(56) References Cited

U.S. PATENT DOCUMENTS

| | | | |
|---|---|---|---|
| 4,810,936 | * 3/1989 | Nuckolls et al. | 315/119 |
| 5,313,141 | 5/1994 | Kimball | 315/169.3 |
| 5,519,288 | 5/1996 | Tatsumi et al. | 315/169.3 |
| 5,789,870 | 8/1998 | Remson | 315/194 |
| 6,038,153 | 3/2000 | Anderson et al. | 363/97 |

* cited by examiner

Primary Examiner—David Vu
(74) Attorney, Agent, or Firm—Paul F. Wille

(57) ABSTRACT

A driver for an EL lamp includes a voltage detector coupled to the lamp for monitoring the voltage across the lamp and providing an indication of when the lamp is substantially discharged.

6 Claims, 3 Drawing Sheets

EL DRIVER WITH LAMP DISCHARGE MONITOR

BACKGROUND OF THE INVENTION

This invention relates to a battery operated power supply for an electroluminescent (EL) lamp and, in particular, to an EL driver having a lamp discharge detector for controlling low frequency switching.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by a driver that converts direct current into alternating current. In order for an EL lamp to glow sufficiently, a peak-to-peak voltage in excess of about one hundred volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of drivers including an inductive boost circuit having an inductor in series with a switching transistor. Current through the inductor causes energy to be stored in a magnetic field around the inductor. When the current is abruptly shut off, the induced magnetic field collapses, producing a pulse of high voltage. The voltage across the inductor is proportional to $L \cdot \delta i / \delta t$. Thus, a low voltage at high current is converted into a high voltage at low current. The voltage on the lamp is pumped up by a series of high voltage pulses from the boost circuit.

The direct current produced by the boost must be converted into an alternating current in order to power an EL lamp. It is known in the art to switch the inductor in such a way as to produce alternating current on a single output; see U.S. Pat. No. 5,313,141 (Kimball). The current through the lamp alternates at a low frequency (200–1000 hertz).

It is known that an EL lamp can produce acoustic noise when electrical pulses are applied to the lamp due to the abrupt discharge of the lamp when polarity is reversed. The abrupt discharge causes a current spike to flow through the lamp that shortens the life of the lamp. It is also known to control the discharge current through an EL lamp to minimize noise generated by the lamp; e.g. U.S. Pat. No. 5,789,870 (Remson) and U.S. Pat. No. 6,038,153 (Andersson et al.).

The prior art uses controlled current devices for discharging a lamp for a minimum period of time, thereby reducing the noise generated by an EL lamp. A problem with these devices is that the discharge time is derived from a clock signal produced locally in an integrated circuit or coupled to the integrated circuit from another source. As an EL lamp ages, the capacitance of the lamp decreases, thereby reducing the time necessary to discharge the lamp, but the time available for discharge does not decrease. Thus, the lamp is "off" for slightly longer periods and the lamp dims even more than due to aging alone.

In view of the foregoing, it is therefore an object of the invention to provide an optimum discharge cycle for an EL lamp driven by a battery powered driver.

Another object of the invention is to improve the life of an EL lamp driven by a battery powered driver.

A further object of the invention is to provide a detector circuit for monitoring the discharge of an EL lamp during each half cycle of the low frequency signal.

SUMMARY OF THE INVENTION

The foregoing objects are achieved in this invention in which a driver for an EL lamp includes a voltage detector coupled to the lamp for monitoring the voltage across the lamp and providing an indication of when the lamp is substantially discharged.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
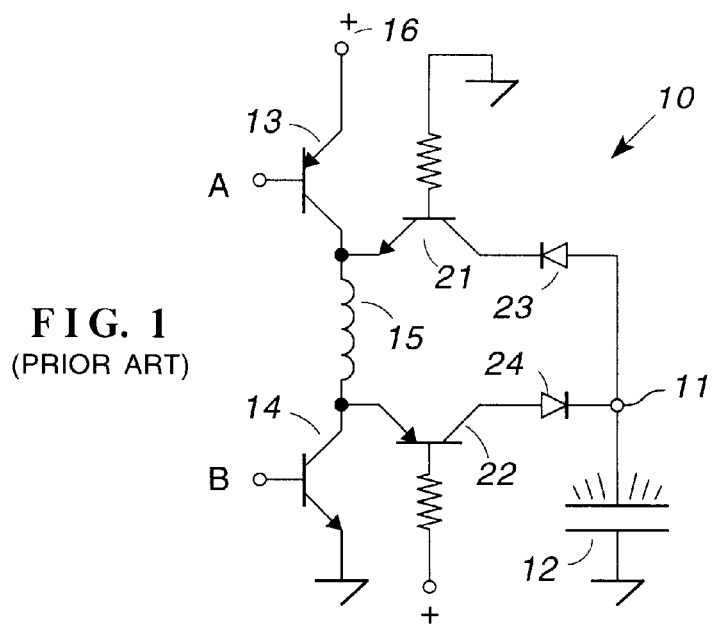
FIG. 1 is a schematic of an EL driver having a single ended output.

FIG. 1 illustrates a converter similar to the converter described in U.S. Pat. No. 5,313,141 (Kimball). Converter 10 has a single ended output, that is converter 10 produces an alternating current at output 11, which enables one electrode of lamp 12 to be grounded. Converter 10 includes transistors 13 and 14 having inductor 15 connected in series between the transistors and the series circuit is connected between DC voltage source 16 and ground. The junction between transistor 13 and inductor 15 is coupled through transistor 21 and diode 23 to output 11. The junction between inductor 15 and transistor 14 is coupled through transistor 22 and diode 24 to output 11. The base of transistor 21 is coupled to ground and the base of transistor 22 is coupled to the supply voltage.

Suitable drive signals are applied to inputs A and B whereby transistor 13 is turned on and remains on while transistor 14 is turned on and off at a high frequency. During this portion of the operation of converter 10, the converter operates much like a simple boost circuit. As transistor 14 turns on and off at high frequency, transistor 22 is forward biased and a series of positive pulse are applied to lamp 12 through diode 24. The voltage on lamp 12 increases incrementally in response to the pulses and a small current flows through lamp 12.

After a short period, the operation of transistors 13 and 14 is reversed, i.e., transistor 14 conducts while transistor 13 is turned on and off at a high frequency. During this portion of the operation of converter 10, inductor 15 produces negative pulses that are coupled through transistor 21 and diode 23 to lamp 12. The negative pulses charge lamp 12 in the opposite direction and current flows in the opposite direction through lamp 12.

After another short period, the operation of transistors 13 and 14 is reversed again. The charging periods are preferably equal in length to prevent a DC voltage from accumulating on lamp 12 and the periods preferably correspond to a frequency between 200 Hz and 1000 Hz. In accordance with the invention, the charging periods are separated by discharge periods, the duration of which depends upon the state of lamp 12. Discharge circuitry (not shown) is coupled to output 11. Apparatus for monitoring the discharge of lamp 12 is illustrated in FIG. 2.

Figure 2:
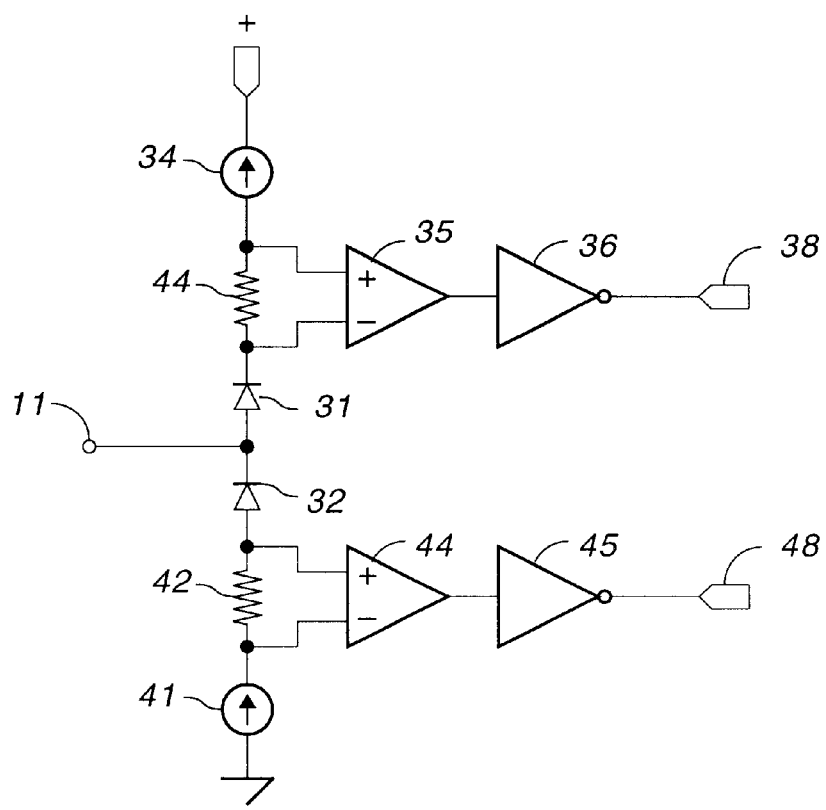
FIG. 2 is a schematic of a discharge detector constructed in accordance with a preferred embodiment of the invention.

FIG. 2 illustrates a monitoring circuit constructed in accordance with the invention. The circuit shown in FIG. 2 could be used as a discharge circuit, by switching current sources 34 and 41 on and off, but separate apparatus is preferred. Suitable discharge circuits are known in the art and preferably include a constant current discharge. In FIG. 2, terminal 11 is coupled to the junction of series coupled isolation diodes 31 and 32. A positive voltage on terminal 11 is monitored by the upper half of the circuit, including diode 31, and a negative voltage on the terminal is monitored by the lower half of the circuit, including diode 32.

The current through diode 31, resistor 44, and current source 34 is limited and produces a predetermined voltage drop across resistor 44. Each end of resistor 44 is coupled to an input of comparator 35. While the voltage on terminal 11 decreases to the supply voltage, source 34 provides a sense current through resistor 44. When the voltage on terminal 11 is substantially zero, the voltage drop across resistor 44 is reduced and comparator 35 changes state. The output from comparator 35 is inverted by amplifier 36 and coupled to terminal 38 to provide an indication that the lamp (not shown in FIG. 2) is discharged.

The lower half of the circuit works the same way as the upper half, except that a negative charge cycle is monitored. While the voltage on terminal 11 is less than zero, source 41 provides current through resistor 42. Each end of resistor 42 is coupled to an input of comparator 44. When the voltage on terminal 11 is substantially zero, the voltage drop across resistor 42 is reduced and comparator 44 changes state. The output from comparator 44 is inverted by amplifier 45 and coupled to terminal 48 to provide an indication that the lamp is discharged.

The particular logic levels on terminals 38 and 48 are immaterial. In one embodiment of the invention, a logic high indicated "done with discharge" for positive charge cycles and a logic low indicated "done with discharge" for negative charge cycles. Similarly, the lamp need not be discharged to ground potential. As disclosed in the above-identified Remson patent, the voltage on the lamp need only be reduced to less than half the maximum voltage in order to reduce noise substantially in most cases.

Figure 3:
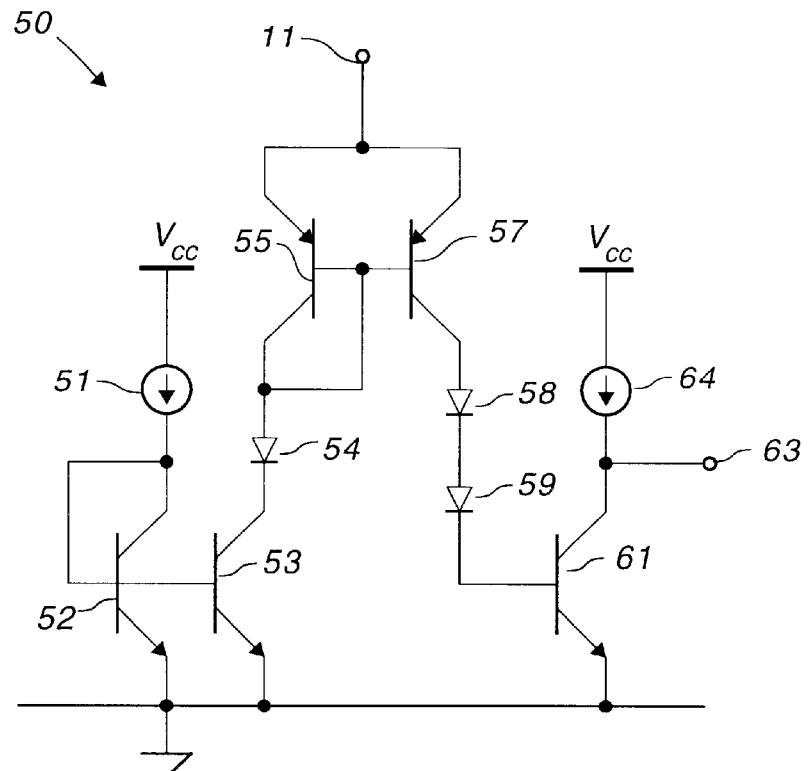
FIG. 3 is a schematic of a positive polarity discharge detector constructed in accordance with an alternative embodiment of the invention.

FIG. 3 illustrates the implementation of a monitor as an integrated circuit. The circuit shown in FIG. 3 monitors positive charge cycles. Current source 51 is connected in series with transistor 52 between the low voltage supply, $V_{cc}$, and ground. The collector and base of transistor 52 are shorted together, making the transistor function as a diode. The bases and emitters of transistors 52 and 53 are coupled together in current mirror configuration. Transistor 53 is coupled in series with diode 54 and transistor 55 between terminal 11 and common. Transistor 55 is connected in diode configuration and is connected with transistor 57 as a current mirror. Transistor 57, diode 58, and diode 59 are connected in series between terminal 11 and the base of transistor 61. Transistor 61 is connected in series with current source 64 between low voltage supply $V_{cc}$ and common. The junction of transistor 61 and current source 64 is coupled to terminal 63.

Current source 51 provides a small current, e.g. one micro ampere, to the current mirror including transistors 52 and 53. If the voltage on terminal 11 is greater than two diode forward voltage drops plus one $V_{sat}$ above ground potential, then transistor 53 conducts a small current, e.g. one micro ampere, through diode 54 and diode-transistor 55.

If the voltage on terminal 11 is greater than two diode forward voltage drops, one $V_{be}$, plus one $V_{sat}$ above ground potential, then transistor 57, diode 58, and diode 59 conduct, turning on transistor 61. When transistor 61 conducts, terminal 63 is brought low. When the voltage on terminal 11 is less than two diode forward voltage drops, one $V_{be}$, plus one $V_{sat}$ above ground potential, then transistor 61 shuts off and terminal 63 rises to slightly less than $V_{cc}$, thereby indicating that an EL lamp (not shown) coupled to terminal 11 is discharged.

Figure 4:
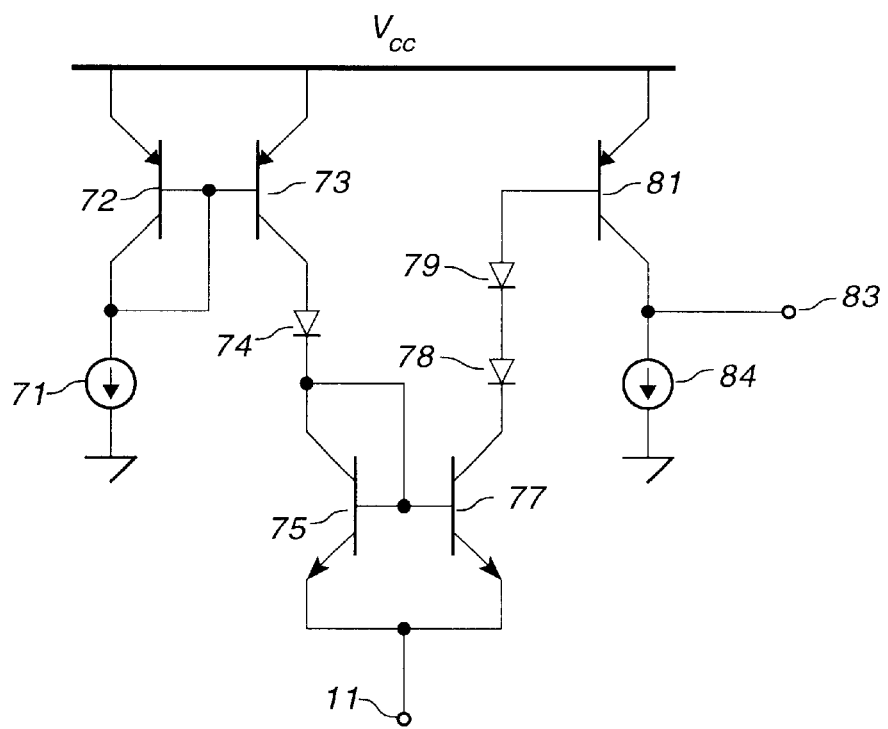
FIG. 4 is a schematic of a negative polarity discharge detector constructed in accordance with an alternative embodiment of the invention.

FIG. 4 illustrates a discharge monitor for negative charge cycles. Current source 71 is connected in series with transistor 72 between the low voltage supply, $V_{cc}$, and ground. The collector and base of transistor 72 are shorted together, making the transistor function as a diode. The bases and emitters of transistors 72 and 73 are coupled together in current mirror configuration. Transistor 73 is coupled in series with diode 74 and transistor 75 between terminal 11 and $V_{cc}$. Transistor 75 is connected in diode configuration and is connected with transistor 77 as a current mirror. Transistor 77, diode 78, and diode 79 are connected in series between terminal 11 and the base of transistor 81. Transistor 81 is connected in series with current source 84 between low voltage supply $V_{cc}$ and common. The junction of transistor 81 and current source 84 is coupled to terminal 83.

Current source 71 provides a small current, e.g. one micro ampere, to the current mirror including transistors 72 and 73. If the voltage on terminal 11 is more than two diode forward voltage drops plus one $V_{sat}$ below $V_{cc}$, then transistor 73 conducts a small current, e.g. one micro ampere, through diode 74 and diode-transistor 75.

If the voltage on terminal 11 is greater than two diode forward voltage drops one $V_{be}$, plus one $V_{sat}$ below $V_{cc}$, then transistor 77, diode 78, and diode 79 conduct, turning on transistor 81. When transistor 81 conducts, terminal 83 rises to slightly less than $V_{cc}$. When the voltage on terminal 11 is less than two diode forward voltage drops one $V_{be}$, plus one $V_{sat}$ above $V_{cc}$, then transistor 81 shuts off and terminal 83 drops to slightly above ground potential, thereby indicating that an EL lamp (not shown) coupled to terminal 11 is discharged. Thus, a low voltage indicates discharge from the negative charging cycle and a high voltage indicates discharge from the positive charging cycle. Additional circuitry can be provided for making the logic levels either high or low as desired.

The output signals on terminals 63 and 83 can be used to initiate the next charging cycle. When this is done, the duration of the discharge cycle shortens as an EL lamp ages because of the decreased capacitance of the lamp. By making the period of one cycle (positive charge, discharge, negative charge, discharge) a constant, the charging cycle is extended as a lamp ages, increasing the voltage on the lamp and compensating for aging.

Figure 5:
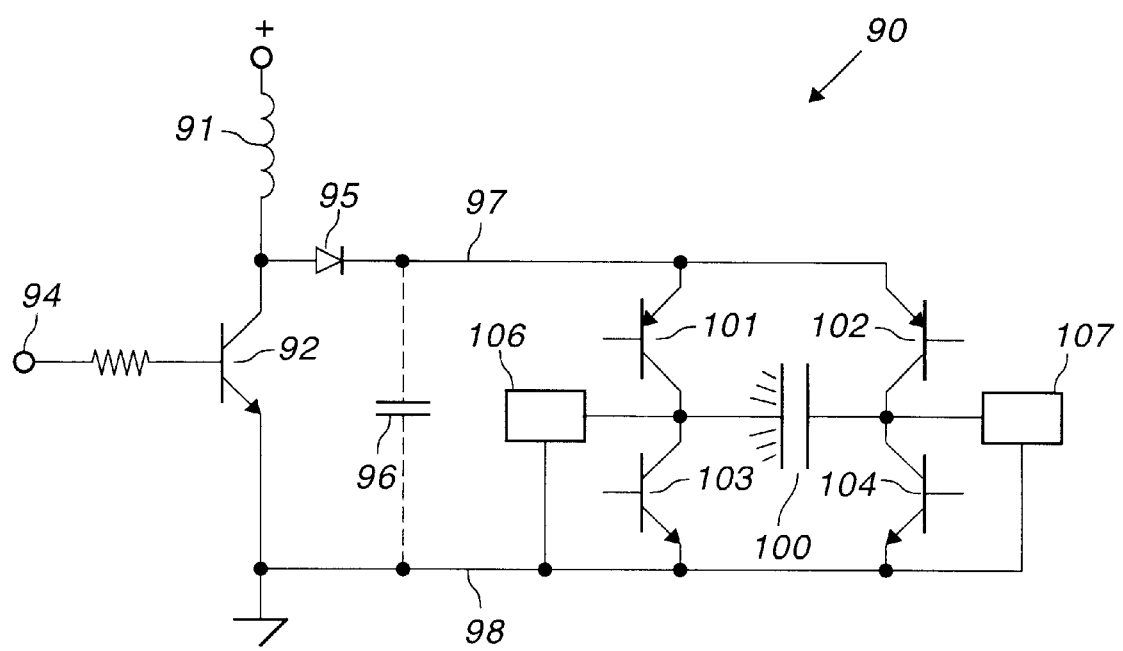
FIG. 5 is a partial block diagram of an alternative embodiment of the invention.

FIG. 5 is a schematic of an alternative embodiment of the invention as applied to an inverter having floating output terminals, e.g. an inverter having what is known as an H-bridge output. Inverter 90 includes an inductive boost and an H-bridge output. The inductive boost includes inductor 91 in series with switching transistor 92 between a low voltage supply (+) and ground. Pulses on input 94 cause transistor 92 to switch on and off, producing a series of high voltage pulses that are coupled by diode 95 to optional storage capacitor 96. The terminals of capacitor 96 form high voltage rail 97 and common rail 98. The H-bridge output includes transistors 101, 102, 103, and 104 coupled between high voltage rail 97 and common rail 98. The AC diagonal of the H-bridge is coupled to EL lamp 100. A number of kinds of pulse generators (not shown) for driving input 94 and the H-bridge are known in the art.

In accordance with the invention, discharge monitoring circuit 106 is coupled to one terminal of EL lamp 100 and discharge monitoring circuit 107 is coupled to the other terminal of the EL lamp. Circuits 106 and 107 can be either the upper half of the circuit illustrated in FIG. 2 or the circuit of FIG. 3. The discharge monitoring circuits can be referenced to supply or to ground. Further, as noted with the other embodiments, discharge monitoring circuits 106 and 107 can also function as discharge circuits.

Assuming that circuits 106 and 107 also provide a discharge function, inverter 90 operates as follows. Control circuitry (not shown) for operating inverter 90 turns on transistors 101 and 104 simultaneously to charge lamp 100 to a first polarity. Transistor 101 is turned off while circuit 106 discharges the left-hand terminal of lamp 100 to a low voltage. At the end of the discharge cycle, circuit 106 produces a signal indicating that the discharge is complete and the next charging cycle begins. Specifically, transistor 104 turns off and transistors 102 and 103 turn on, charging EL lamp 100 to the opposite polarity. At the end of the charging cycle, transistor 102 is turned off and circuit 107 is turned on, discharging lamp 100 to a low voltage. At the end of the discharge cycle, circuit 107 produces a signal indicating that the discharge is complete and the next charging cycle begins by turning off transistor 103.

The invention thus provides a detector circuit for monitoring the discharge of an EL lamp during each half cycle of the low frequency signal. The invention also provides an optimum discharge cycle for an EL lamp driven by a battery powered driver by providing a signal when the lamp is discharged. The operating life of an EL lamp is extended by automatic compensation for aging.

Having thus described the invention, it will be apparent to those of skill in the art that various modifications can be made within the scope of the invention. For example, in FIGS. 3 and 4, the voltage at which an EL lamp is considered discharged can be varied by adding diodes in series with diodes 58, 59 or 78, 79. As previously noted, the discharge monitors can be used as the discharge circuits by using switched current sources for sources 34, 41, 51, and 71.

What is claimed as the invention is:

1. A method for driving an EL lamp from a battery, said method comprising the steps of:

charging the EL lamp to a first polarity during a first period;

discharging the EL lamp during a second period;

charging the EL lamp to a second polarity during a third period;

discharging the EL lamp during a fourth period;

while monitoring the voltage on the EL lamp and initiating the next charging step when the voltage on the EL lamp is less than a predetermined magnitude.

2. The method as set forth in claim 1 wherein the sum of the first period and the second period is kept constant.

3. The method as set forth in claim 1 wherein the sum of the periods is kept constant.

4. In an inverter for an electroluminescent lamp, the inverter including a boost circuit and means for reversing the polarity of the voltage applied to the lamp, the improvement comprising:

a first voltage detector coupled to the lamp for monitoring the voltage across the lamp and providing an indication of when the lamp is substantially discharged.

5. The inverter as set forth in claim 4 wherein said inverter includes a single ended output and said first voltage detector includes a first circuit for detecting discharge from a positive voltage and a second circuit for detecting discharge from a negative voltage.

6. The inverter as set forth in claim 4 wherein said inverter includes an H-bridge output and said first voltage detector is coupled to a first terminal of said EL lamp and a second voltage detector is coupled to a second terminal of said EL lamp.

* * * * *